(12) United States Patent
Myers et al.

(10) Patent No.: US 10,756,780 B2
(45) Date of Patent: Aug. 25, 2020

(54) RE-CONFIGURING SATELLITE ANTENNAS BASED ON THE NUMBER OF SATELLITES IN A CONSTELLATION

(71) Applicant: TOTUM LABS, INC., San Diego, CA (US)

(72) Inventors: Theodore Jon Myers, San Diego, CA (US); Matthew Zacchariah Hughes, San Diego, CA (US)

(73) Assignee: TOTUM LABS, INC., San Diego, CA (US)

(*) Notice: Subject to any disclaimer, the term of this patent is extended or adjusted under 35 U.S.C. 154(b) by 0 days.

(21) Appl. No.: 16/362,586

(22) Filed: Mar. 22, 2019

(65) Prior Publication Data
US 2020/0028577 A1   Jan. 23, 2020

Related U.S. Application Data

(60) Provisional application No. 62/699,899, filed on Jul. 18, 2018.

(51) Int. Cl.
| | |
|---|---|
| *H04B 7/185* | (2006.01) |
| *H04W 84/06* | (2009.01) |
| *H04B 7/01* | (2006.01) |
| *H04B 17/40* | (2015.01) |
| *H04W 64/00* | (2009.01) |

(52) U.S. Cl.
CPC ............ *H04B 7/01* (2013.01); *H04B 7/185* (2013.01); *H04B 7/18513* (2013.01); *H04B 7/18515* (2013.01); *H04B 7/18521* (2013.01); *H04B 7/18595* (2013.01); *H04B 17/40* (2015.01); *H04W 64/003* (2013.01); *H04B 7/18523* (2013.01)

(58) Field of Classification Search
CPC ...... H04B 7/185–18578; H04B 17/102; H04B 7/2041; H04B 17/40; H04B 7/01; H04B 7/18595; H04W 84/06; H04W 64/003; G01S 1/00
USPC ........................................ 455/12.1, 13.1–13.4
See application file for complete search history.

(56) References Cited

U.S. PATENT DOCUMENTS

| | | | |
|---|---|---|---|
| 4,375,697 A | * | 3/1983 | Visher ................. H04B 7/19 244/158.4 |
| 5,761,608 A | | 6/1998 | Andresen et al. |
| 6,011,951 A | | 1/2000 | King et al. |
| 9,661,473 B1 | | 5/2017 | Jarvis et al. |
| 2005/0270999 A1 | | 12/2005 | Schiff et al. |
| 2007/0199380 A1 | * | 8/2007 | Daoud .............. F01N 11/002 73/596 |
| 2010/0328145 A1 | | 12/2010 | Wang et al. |
| 2012/0224549 A1 | | 9/2012 | Myers et al. |

(Continued)

FOREIGN PATENT DOCUMENTS

EP   1 006 679 A1   6/2000

*Primary Examiner* — Philip Sobutka
(74) *Attorney, Agent, or Firm* — Foley & Lardner LLP

(57) ABSTRACT

An illustrative embodiment disclosed herein is a satellite including a transceiver, a first antenna, a second antenna, and a switch to enable only the first antenna by electrically coupling the first antenna to the transceiver responsive to a satellite constellation having less than a threshold number of satellites and enable only the second antenna by electrically coupling the second antenna to the transceiver responsive to the satellite constellation having greater than the threshold number of satellites.

15 Claims, 10 Drawing Sheets

(56) References Cited

U.S. PATENT DOCUMENTS

2013/0002479 A1    1/2013   Pratt et al.
2019/0041526 A1    2/2019   Lucky et al.
2019/0058522 A1    2/2019   Haley et al.

\* cited by examiner

RE-CONFIGURING SATELLITE ANTENNAS BASED ON THE NUMBER OF SATELLITES IN A CONSTELLATION

CROSS-REFERENCE TO RELATED APPLICATION

This application is related to and claims priority under 35 U.S. § 119(e) from U.S. Patent Application No. 62/699,899, filed Jul. 18, 2018, titled "METHOD AND SYSTEM FOR A HYBRID SATELLITE TERRESTRIAL LOW POWER WIDE AREA NETWORK," the entire contents of which are incorporated herein by reference for all purposes.

BACKGROUND

The following description is provided to assist the understanding of the reader. None of the information provided or references cited is admitted to be prior art.

There is tremendous value in connecting billions of devices if the cost of connectivity can be made sufficiently low. There have been many attempts to address the Low Power Wide Area (LPWA) market. A fundamental problem is the cost of deploying a terrestrial-only network due to the amount of infrastructure required especially if indoor coverage is required. On the other hand, conventional satellite technology is expensive relative to the required LPWA cost-point and does not reliably reach indoors.

SUMMARY

Aspects of the present disclosure relate to a system and method for a Low Power Wide Area (LPWA) network, and more particularly to a system and method for re-configuring a satellite antenna.

An illustrative embodiment disclosed herein is a satellite including a transceiver, a first antenna, a second antenna, and a switch to enable only the first antenna by electrically coupling the first antenna to the transceiver responsive to a satellite constellation having less than a threshold number of satellites and enable only the second antenna by electrically coupling the second antenna to the transceiver responsive to the satellite constellation having greater than the threshold number of satellites.

Another illustrative embodiment disclosed herein is a method including responsive to a number of satellites in a satellite constellation becoming greater than a threshold number, disabling, by a switch, a first antenna by disconnecting the first antenna from a transceiver and enabling, by the switch, a second antenna by connecting the second antenna to the transceiver.

Another illustrative embodiment disclosed herein is a non-transitory computer readable storage medium to store a computer program configured to execute operations including, responsive to a number of satellites in a satellite constellation becoming greater than a threshold number, disabling a first antenna by disconnecting the first antenna from a transceiver and enabling a second antenna by connecting the second antenna to the transceiver.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
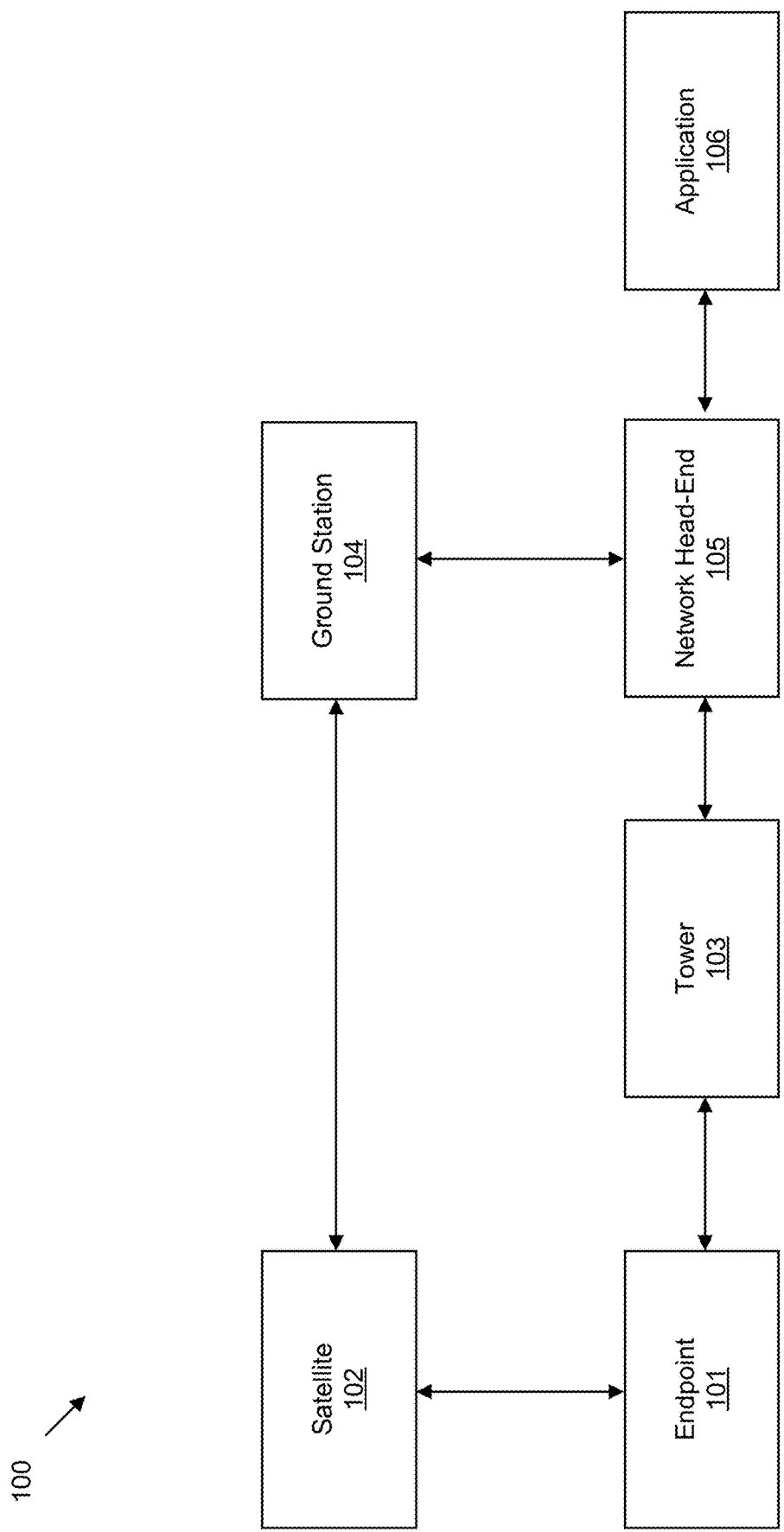
FIG. 1 is an example block diagram of a hybrid network, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

There is tremendous value in connecting billions of devices if the cost of connectivity can be made sufficiently low. There have been many attempts to address the Low Power Wide Area (LPWA) market. A fundamental problem is the cost of deploying a terrestrial-only network due to the amount of infrastructure required especially if indoor coverage is required. On the other hand, conventional satellite technology is expensive relative to the required LPWA cost-point and does not reliably reach indoors.

A hybrid network employing both Low Earth Orbit (LEO) satellites and terrestrial (or tower) elements has the potential to have the best attributes of both satellite-only and terrestrial-only networks. Additional benefits unique to the hybrid approach also exist with the selection of Direct Sequence Spread Spectrum (DSSS) as the communication technology approach. A DSSS hybrid satellite and terrestrial approach will address the connectivity needs of billions of devices at the required price-point.

Another aspect of the disclosure is a wireless multiple access scheme where a serving satellite of the network is able perform multiple time-of-flight measurements with multiple endpoints while avoiding corrupted packets due to interference among the multiple endpoints. The multiple time-of-flight measurements can be used to support trilateration to calculate the location of the multiple endpoints.

Another aspect of the disclosure is a reliable delivery of downlink data for the case when the serving satellite does not necessarily have connectivity to a ground station when in range to the endpoint. By not requiring simultaneous connectivity to the ground station and the endpoint, the satellite effectively extends its coverage. The network also determines a set of candidate satellites to broadcast information to for serving the ground station and the endpoint. By reducing the number of satellites to broadcast to, the network saves bandwidth and storage capacity.

Another aspect of the disclosure is a method of compensating for changing Doppler frequency offset. The satellites are moving at velocities that are high enough to cause the rate of change of the relative velocity between endpoints and satellite to become a problem for a network employing a Direct Sequence Spread Spectrum (DSSS) system at high spreading factors. A measurement and compensation technique achieves sufficiently high spreading factors that allow indoor coverage from a LEO satellite.

Another aspect of the disclosure is a method of a selectable satellite antenna that allows for deeper satellite coverage as the satellite constellation is densified over time. The selectable satellite antenna is flexible in meeting the needs a satellite network depending on the phase of deployment. In the early phase of deployment, less than a threshold number of satellites may be available to cover the earth. In such a scenario, the network may use a lower gain antenna which maximizes the footprint of the satellite, at the expense of the depth of coverage that a higher gain antenna provides. Once greater than the threshold number of satellites are part of the constellation, and the required footprint of the satellite becomes smaller, the network may use a higher gain antenna to provide deeper coverage based on the additional antenna gain.

Referring now to FIG. 1, a hybrid network 100 is shown. The hybrid network 100 is a wide area network (WAN) architecture that incorporates both a satellite component and terrestrial component. In brief overview, the hybrid network 100 may include an endpoint 101, a satellite 102, a tower 103, a ground station 104, a network head-end 105, and an application 106. The endpoint 101 may be wirelessly coupled to the satellite 102 and the tower 103. The tower 103 can also be referred to as a terrestrial network. The satellite 102 may be wirelessly coupled a ground station 104, and the satellite 102 may include a high gain antenna. The tower 103 and the ground station 104 may be coupled to the WAN via the network head-end 105. The application 106 that leverages the data from the endpoint 101 may be coupled via the network head-end 105. The network head-end 105 may function as an interface for the application 106. The application may send and receive data to the endpoint 101 via the network head-end 105. Although one of each component in the hybrid network 100 is shown, there may be greater than one of some or all of the components. For example, the hybrid network 100 may include greater than one endpoint.

Figure 2:
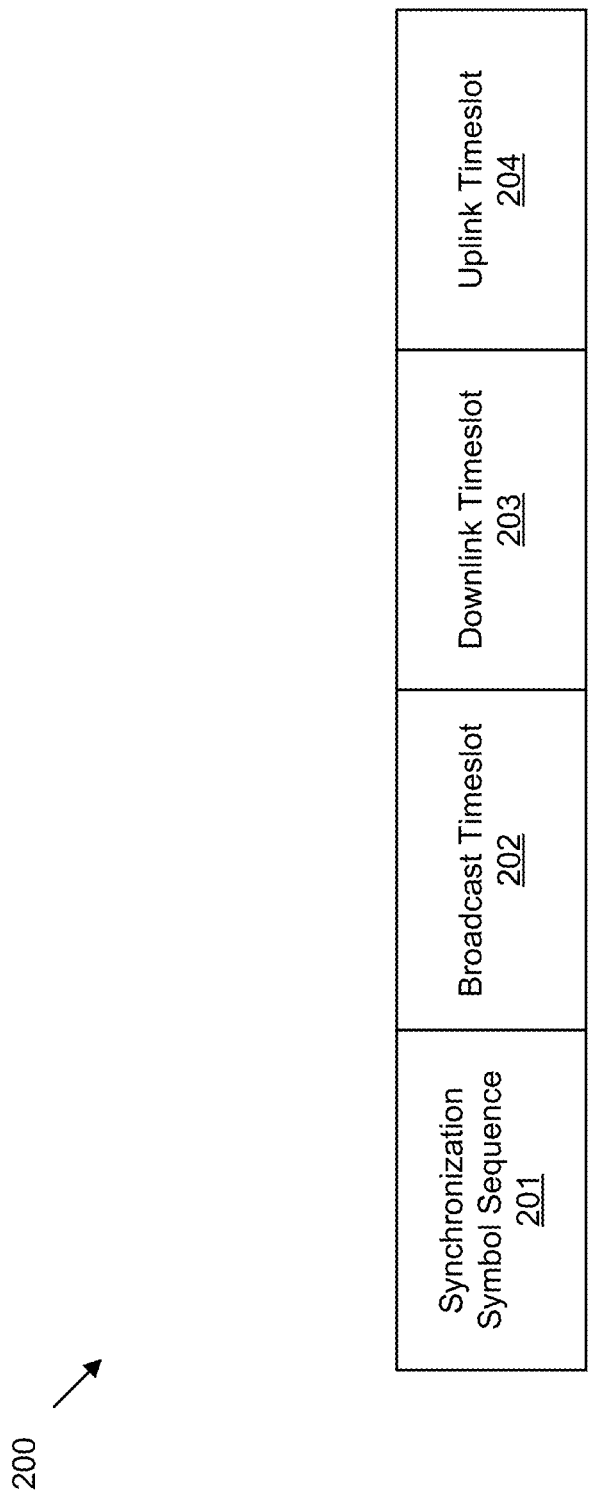
FIG. 2 is an example diagram of a frame structure of the hybrid network, in accordance with some embodiments of the present disclosure.

Referring now to FIG. 2, an example frame structure 200 of the hybrid network 100. In brief overview, the frame structure 200 includes a synchronization symbol sequence 201, a broadcast timeslot 202, a downlink timeslot 203, and an uplink timeslot 204. The frame may repeat at a regular rate. The endpoint 101 may use the synchronization symbol sequence 201 to acquire frame timing, synchronization, and knowledge of which of the satellites 102 or towers 103 are candidates to establish a wireless link. All endpoints 101 that are awake and within link range may receive the broadcast timeslot 202. The broadcast timeslot 202 may include system parameters such as satellite 102 or tower 103 identification, system frame number which can map directly to time, and other parameters required for the endpoint 101 to be capable of demodulating a link. The satellite 102 or the tower 103 may transmit downlink data to a specific endpoint 101 during the downlink timeslot 203. The endpoint 101 may transmit to the satellite 102 or tower 103 during the uplink timeslot 204.

Figure 3:
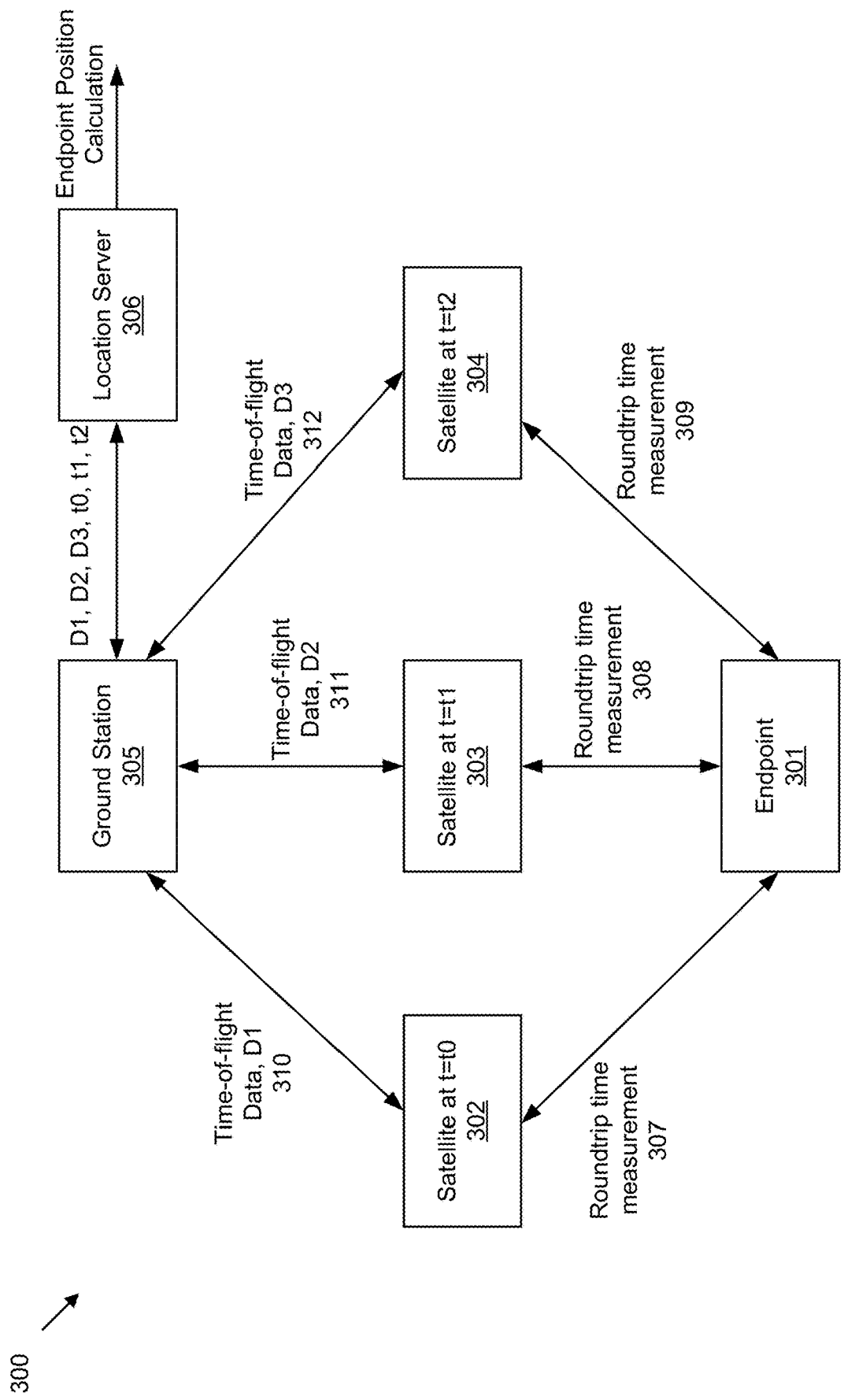
FIG. 3 is an example block diagram of a wireless multiple access scheme for determining a distance to an endpoint, in accordance with some embodiments of the present disclosure.

Referring now to FIG. 3, a wireless multiple access scheme 300 for determining a distance to an endpoint is shown. In brief overview, the multiple access scheme 300 may include one or more endpoints, such as an endpoint 301, and one or more satellites, such as a satellite at t=t0 302, satellite at t=t1 303, and a satellite at t=t2 304. The satellite at t=t0 302, the satellite at t=t1 303, and the satellite at t=t2 30 may be collectively referred to herein as the satellites 302-304. The endpoint 301 may be an instance of the endpoint 101 described with respect to FIG. 1. The satellites 302-304 may be instances of the satellite 102 described with respect to FIG. 1. In some embodiments, satellite at t=t0 302 is a same satellite as satellite at t=t1 303. The same may be true for any two of the satellites 302-304 with respect to FIG. 3. The multiple access scheme 300 may further include one or more ground stations 305 and a location server 306. The ground station 305 may be an instance of the ground station 104 described with respect to FIG. 1. The location server 306 may be an instance of the network head-end 105 described with respect to FIG. 1. Although only one endpoint 301 is depicted, in other embodiments, greater than one endpoint may be used. Although the satellites 302-304 are depicted, in other embodiments, greater than three satellites may be used. Although only one ground station 305 is depicted, in other embodiments, greater than one ground station may be used.

The endpoint 301 may have its position determined uniquely through three communication events. Those events may be between as few as two satellites, such as the satellites 302-304. The endpoint 301 may have three successful link transactions with the satellites 302-304. Roundtrip time measurement 307 is measured at between the endpoint 301 and the satellite at t=t0 302. Roundtrip time measurement 308 is measured at between the endpoint 301 and the satellite at t=t1 302. Roundtrip time measurement 309 is measured at between the endpoint 301 and the satellite at t=t2 304. The time-of-flight data 310, 311, and 312 may be transmitted by the satellites 302-304 at the given times, respectively, to the one or more ground stations 305. The one or more ground stations 305 may relay the time-of-flight data 310, 311, and 312 with a timestamp and the satellite of origin to a location server 306. Since the distance is known from the time-of-flight data 310, 311, and 312, the speed of light is known. Thus, the position of the satellites 302-304 are known based on time-stamps. Accordingly, the location server 306 is able to employ trilateration to get an accurate measure of the location of the endpoint 301.

Figure 4A:
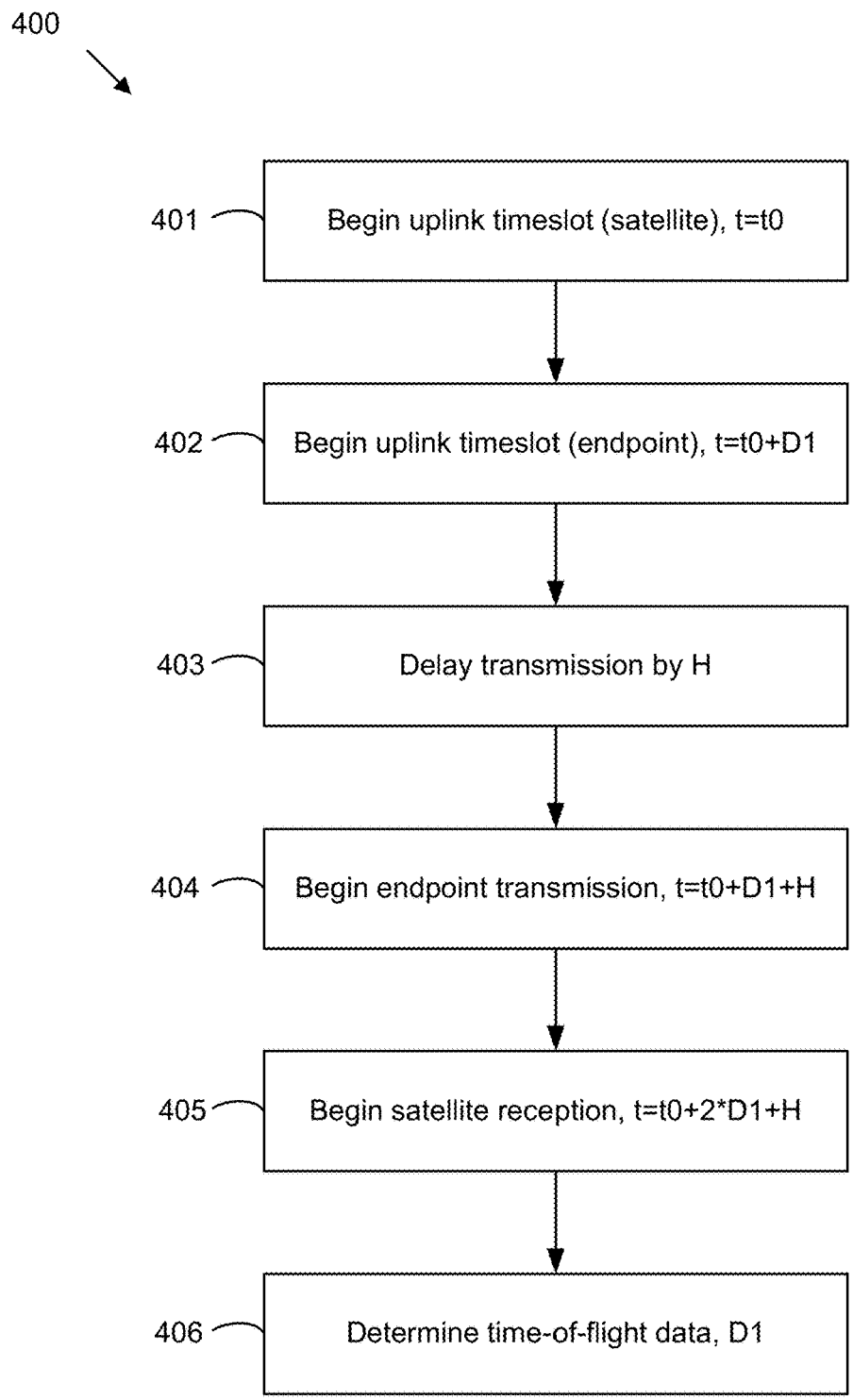
FIG. 4A is an example method for making a time-of-flight measurement, in accordance with some embodiments of the present disclosure.

Referring now to FIG. 4A, an example method 400 for making a time-of-flight measurement is shown. The method 400 for making a time-of-flight measurement may be implemented using, or performed by, the components of the wireless multiple access scheme 300 detailed herein with respect to FIG. 3. Additional, fewer, or different operations may be performed in the method 400 depending on the embodiment. In some embodiments, the time-of-flight measurement is made between an endpoint, such as endpoint 301, and a satellite, such as one of satellites 302-304. Without loss of generality, the described embodiment is a calculation of a time-of-flight measurement between endpoint 301 and the satellite at t=0 302, which may be referred to herein as the satellite 302. At operation 401, the satellite 302 may determine the beginning of uplink timeslot 204, referred to herein as t0. At operation 402, the endpoint 301 may determine the beginning of the uplink timeslot 204, but the time reference is advanced by the time-of-flight, D1, between satellite is 302 and endpoint 301. At operation 403, the endpoint 301 may intentionally delay the transmission of a frame of information by a quantity H. The quantity H may be the output of a hashing function between the unique media access control identifier (MAC ID) of endpoint 301 along with a notion of time such as system frame number (SFN), but other algorithms and data inputs are possible. The endpoint 301 may receive the data inputs and the algorithm in a payload (or preamble) of a packet received from the satellite 302. At operation 404, the endpoint 301 may transmit the transmission to the satellite 302. At operation 405, the satellite 302 may receive the transmission from the endpoint 301. The satellite 302 may have access to the same information that created the hash, and the hashing algorithm itself. In some embodiments, the satellite 302 receives the data inputs and the algorithm for the hash in a payload (or preamble) of a packet in the transmission received from the endpoint 301. As part of the demodulation of that signal, a time delay of (D1+H)+D1 may be observed since the uplink signal also is delayed by D1 due to transit time based on the speed-of-light. At operation 406, the satellite determines the time-of-flight data, D1. Since the satellite 302 may recover the data that goes into the hash calculation (such as MAC ID and SFN), it can subtract out H and solve for the time-of-flight, D1.

Figure 4B:
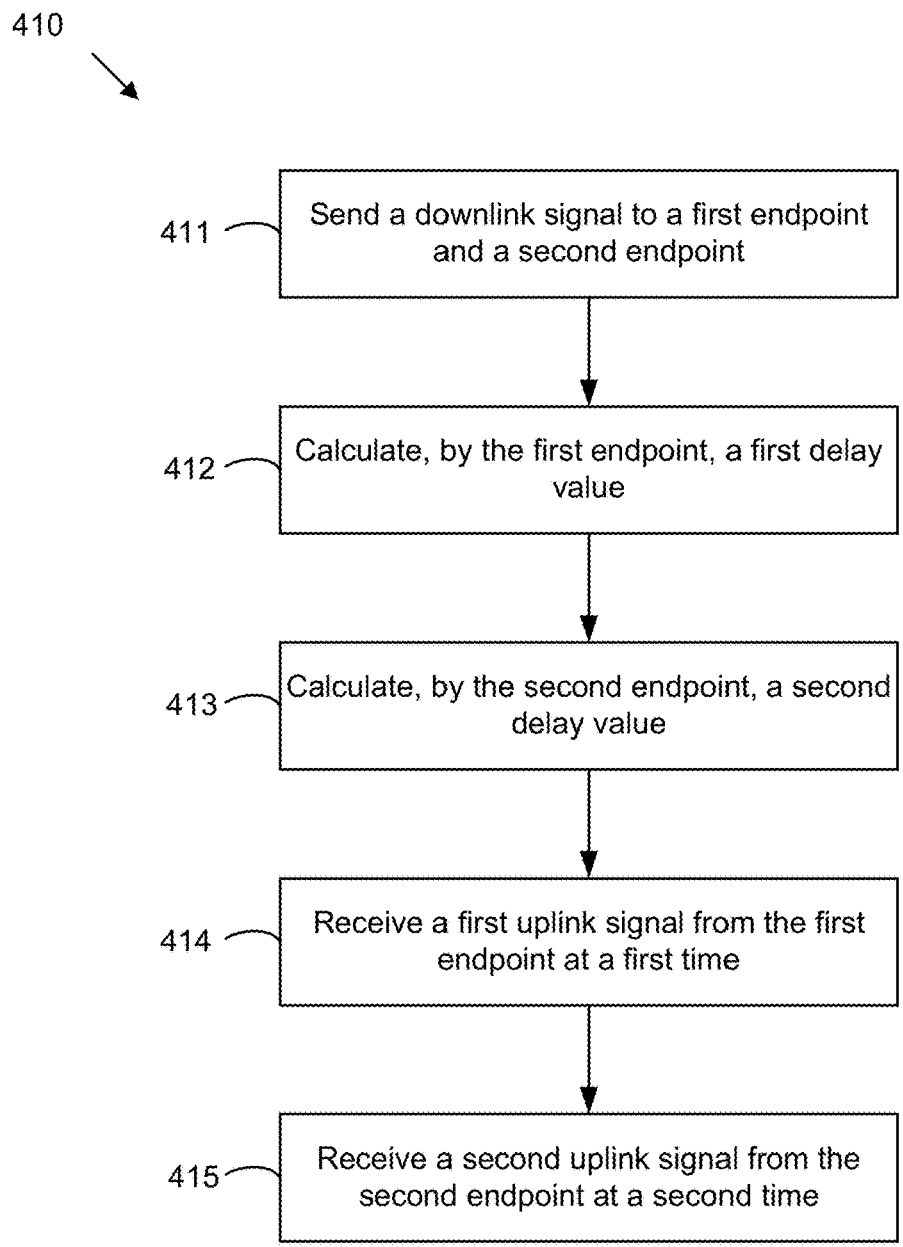
FIG. 4B is an example method for measuring time-of-flight of multiple endpoints, in accordance with some embodiments of the present disclosure.

Referring now to FIG. 4B, an example method 410 for measuring time-of-flight of multiple endpoints is shown. The method 410 for measuring time-of-flight of multiple endpoints may be implemented using, or performed by, the components of the wireless multiple access scheme 300 detailed herein with respect to FIG. 3. Additional, fewer, or different operations may be performed in the method 400 depending on the embodiment. The method 410 may include some or all of the operations of the method 400 with respect to each endpoint. In some embodiments, the method 410 is performed by a satellite, such as one of satellites 302-304, a first endpoint, such as endpoint 301, and a second endpoint similar to endpoint 301 but not depicted in FIG. 3. At operation 411, the satellite sends one or more downlink signals to the first endpoint and the second endpoint. In some embodiments, the first endpoint and the second endpoint are in a same geographic region such that they receive the downlink signal at a substantially similar or same time. At operation 412, the first endpoint calculates a first delay value, H1. The delay value H1 may be the output of an algorithm, such as a hashing function, receiving one or more identifiers of the first endpoint as inputs. The one or more identifiers may include unique MAC ID of the first endpoint and an SFN. The first endpoint may intentionally delay the transmission of the responding uplink signal to the satellite by an amount equal to H1. At operation 413, the second endpoint calculates a second delay value, H2. The delay value H2 may be the output of the algorithm and one or more identifiers of the second endpoint. The second endpoint may intentionally delay the transmission of the responding uplink signal to the satellite by an amount equal to H2. At operation 414, the satellite receives a first uplink signal from the first endpoint at a first time responsive to the first endpoint delaying transmission by the delay value H1. At operation 415, the satellite receives a second uplink signal from the second endpoint at a second time different from the first time. The satellite receives the second uplink signal at the second time responsive to the second endpoint delaying transmission by the delay value H2. In some embodiments, the first uplink signal and the second uplink signal overlap in their times of arrival at satellite. In some such embodiments, the first uplink signal and the second uplink signal are offset from each other by at least one chip offset, wherein each of the uplink signals comprises multiple chips of information. Upon receiving the first uplink signal and the second uplink signal, the satellite determines the distances to each of the first endpoint and the second endpoint using operations described with respect to FIG. 4A.

Figure 5A:
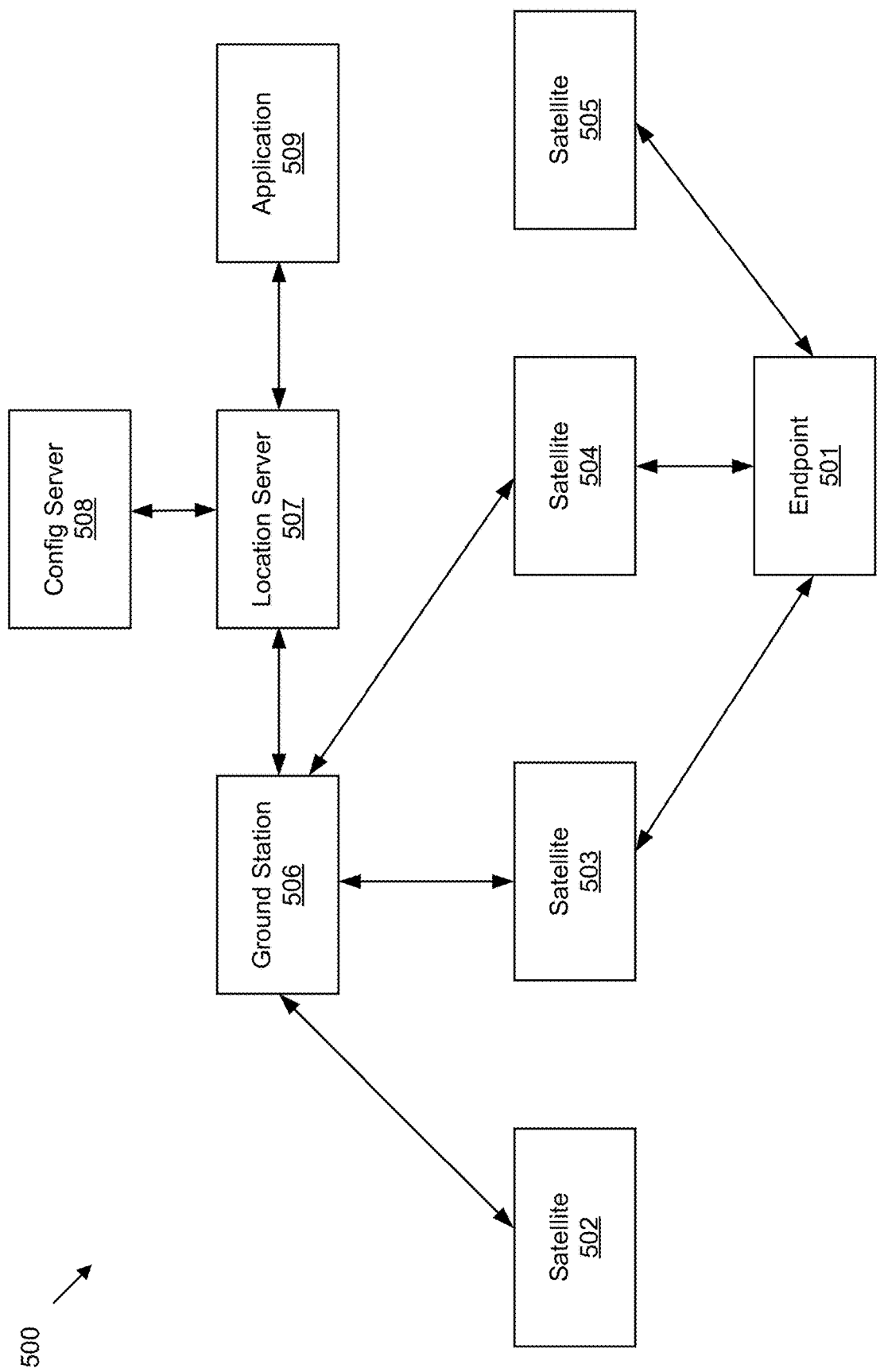
FIG. 5A is an example block diagram of a satellite network for delivering downlink data, in accordance with some embodiments of the present disclosure.

Referring now to FIG. 5A, a satellite network 500 for delivering downlink data is shown. In brief overview, the satellite network 500 may include an endpoint 501, a satellite 502, a satellite 503, a satellite 504, a satellite 505, one or more ground stations 506, a location server 507, a config server 508, and an application 509. The satellites 502, 503, 504, and 505 may be collectively referred to herein as the satellites 502-505. The location server 507 is coupled to the one or more ground stations 506, the config server 508, and the application 509. The one or more ground stations 506 may be coupled to one or more of the satellites 502-505. The endpoint 501 may be coupled to one or more of the satellites 502-505. The endpoint 501 may be an instance of the endpoint 101 as described in FIG. 1. The satellites 502-505 may be instances of the satellite 102 described with respect to FIG. 1. The one or more ground stations 506 may be an instance of the ground station 104 described with respect to FIG. 1. The location server 507 may be an instance of the network head-end 105 described with respect to FIG. 1. The application 509 may be an instance of the application 106 described with respect to FIG. 1. In some embodiments, the satellite network 500 may include greater than or less components. For example, the satellite network 500 may include greater than one endpoint.

Figure 5B:
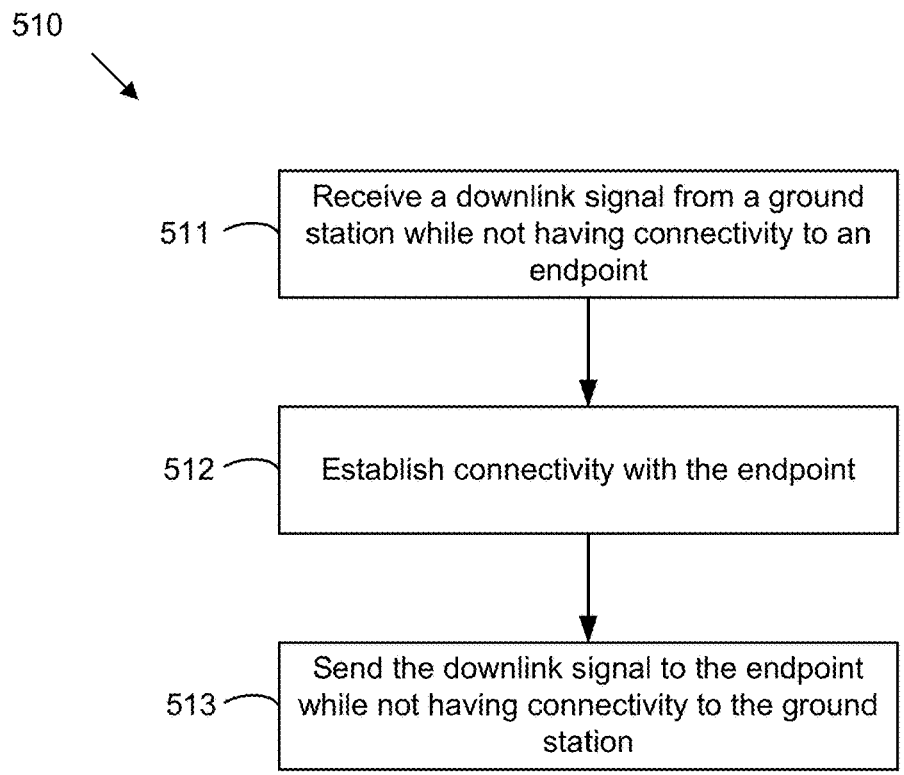
FIG. 5B is an example method for storing and forwarding downlink data, in accordance with some embodiments of the present disclosure.

Referring now to FIG. 5B, an example method 510 for storing and forwarding downlink data is shown. The method 510 for storing and forwarding downlink data may be implemented using, or performed by, the components of the satellite network 500 detailed herein with respect to FIG. 5. Additional, fewer, or different operations may be performed in the method 510 depending on the embodiment. The method 510 may be implemented in an environment where a serving satellite, such as the satellite 503, does not have connectivity to a back-end, such as the ground station 506, when in range to a target endpoint, such as the endpoint 501. Without loss of generality, the embodiment herein will be described with respect to the satellite 503, the ground station 506, and the endpoint 501. At operation 511, the satellite 503 receives a first downlink signal from the ground station 506 while not having connectivity to the endpoint 501. In some embodiments, the satellite 503 does not have connectivity to the endpoint 501 because of a distance between the satellite 503 and the endpoint 501, multi-path fading, Doppler frequency shift, and/or the like. The satellite 503 may store content of the first downlink signal. The content may include a physical data unit (PDU), a datagram, a packet, a preamble, a payload, data, metadata, bits, and the like. At operation 512, the satellite 503 establishes a connection with the endpoint 501. In some embodiments, the satellite 503 establishes the connection with the endpoint 501 when the satellite 503 moves within the range of the endpoint 501. In some such embodiments, the satellite 503 moves out of range of the ground station 506. The satellite 503 may lose the connection with the ground station 506. At operation 513, the satellite 503 sends a second downlink signal to the endpoint 501 while not having connectivity to the ground station 506. The second downlink signal may include the same content as the first downlink signal. In some embodiments, the satellite 503 does not have connectivity to the ground station 506 because of a distance between the satellite 503 and the ground station 506, multi-path fading, Doppler frequency shift, and/or the like.

Figure 5C:
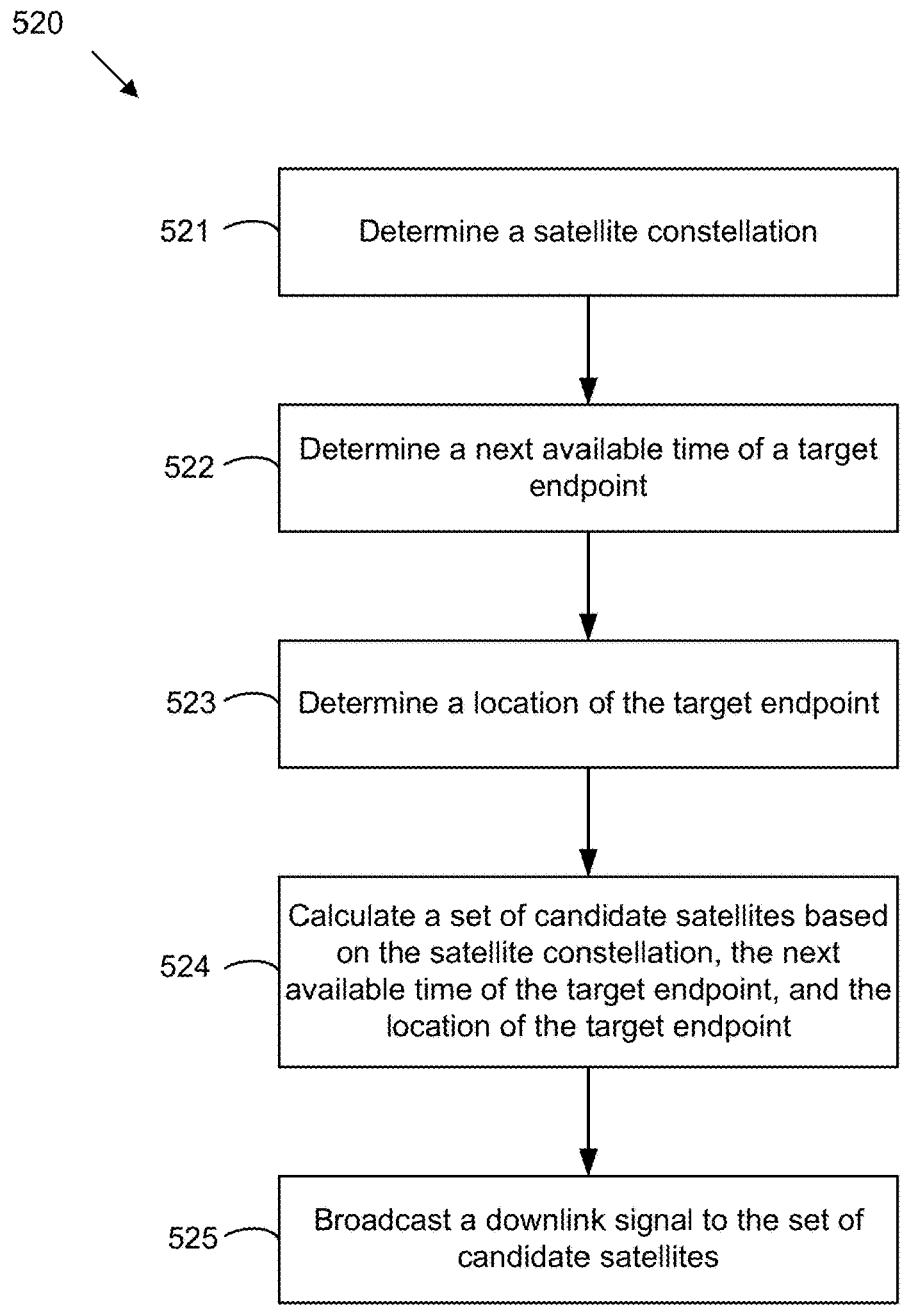
FIG. 5C is an example method for selecting candidate satellites for communicating with a target endpoint, in accordance with some embodiments of the present disclosure.

Referring now to FIG. 5C, an example method 520 for selecting candidate satellites for communicating with a target endpoint is shown. The method 520 for selecting the candidate satellites for communicating with the target endpoint may be implemented using, or performed by, the components of the satellite network 500 detailed herein with respect to FIG. 5. Additional, fewer, or different operations may be performed in the method 520 depending on the embodiment. At operation 521, the location server 507 determines a satellite constellation of satellites, such as the satellites 502-505. At operation 522, the location server 507 determines a next available time that the target endpoint, such as the endpoint 501, is available. The target endpoint's next available time may be the next time that the target endpoint is awake. The next available time may be supplied by the config server 508. At operation 523, the location server 507 determines a location of the target endpoint. The location server 507 may determine the location of the target endpoint by performing trilateration as described with respect to FIG. 3. The location of the target endpoint may be a location of the target endpoint at the next available time.

At operation 524, location server 507 determines a set of candidate satellites, such as the satellites 502, 503, and 504, that may be in range with the target endpoint at the target endpoint's next available time. The determination of the set of candidate satellites may be based on the satellite constellation, the target endpoint location, and the next available time of the target endpoint. At operation 525, the location server 507 may instruct the ground station 506 to broadcast the downlink signal to the set of candidate satellites. The location server 507 may instruct the ground station 506 to transmit to each of the candidate satellites during a time period in which the respective candidate satellite has connectivity to the ground station 506. The downlink signal may be generated by the application 509 and forwarded by the location server 507 to the ground station 506. After the target endpoint becomes available, the target endpoint may establish a link to some or all of the candidate satellites. The target endpoint may determine the strongest link by measuring a signal strength of some or all of the candidate satellites. In some such embodiments, the target endpoint receives the downlink signal from the candidate satellite with the greatest signal strength.

In some embodiments, the satellite with the greatest signal strength is not a member of the candidate satellites, such as the satellite 505. In some such embodiments, the target endpoint waits until the satellite with the greatest signal strength receives the downlink signal from the ground station. In some such embodiments, the target endpoint receives the downlink signal from a satellite with the second greatest signal strength. In some embodiments, the satellite with the greatest signal strength does not have sufficient downlink capacity (or is getting close to insufficient downlink capacity). Whereas more bandwidth allows for high capacity on the uplink, this is not true on the downlink, with a transmit power limited situation that is often the case in a satellite system. The satellite with the greatest signal strength may signal insufficient capacity either in the broadcast timeslot 202 or modulated upon the synchronization symbol sequence 201. Based on that information, then target endpoint may wait until the satellite with the greatest signal strength retains sufficient capacity. In general, the target endpoint may receive the downlink signal from the strongest satellite that is in the set of candidate satellites (and thus has access to the downlink datagram) and does not have capacity limitations.

Figure 6:
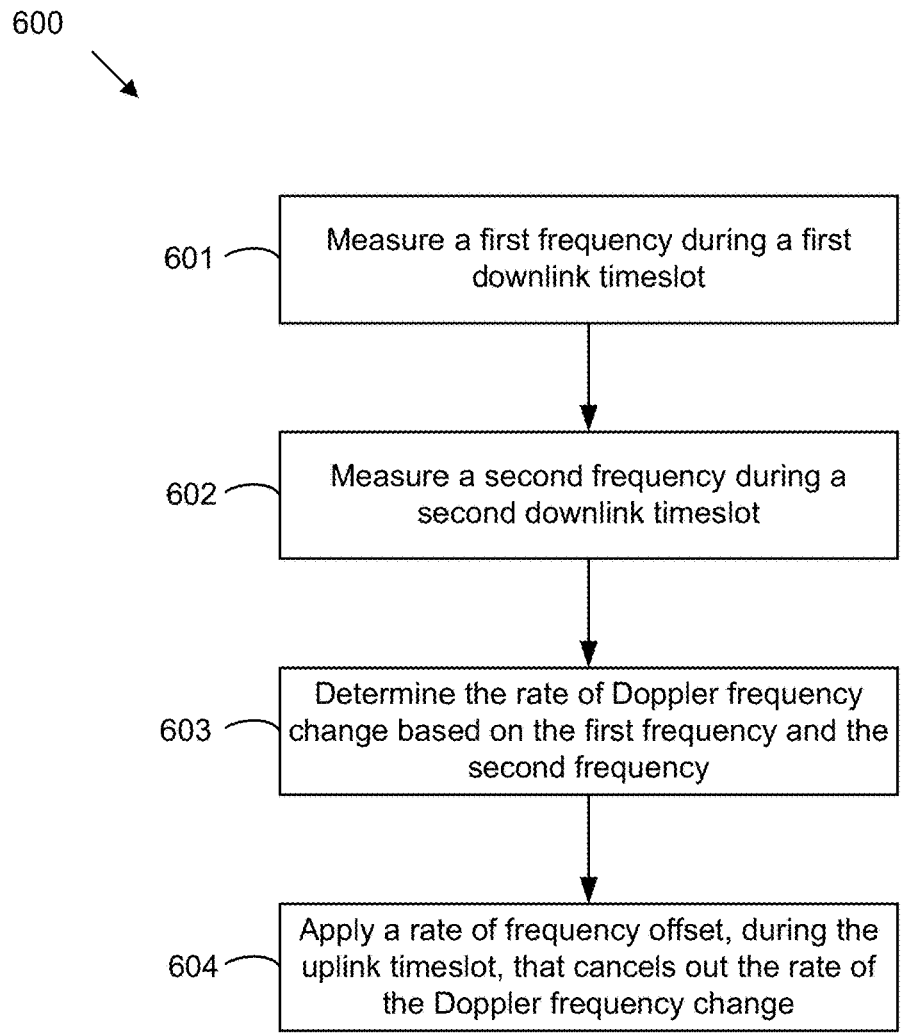
FIG. 6 is an example method for compensating a Doppler frequency offset, in accordance with some embodiments of the present disclosure.

Referring now to FIG. 6, an example method 600 for compensating a changing Doppler frequency offset is shown. The method 600 for compensating a changing Doppler frequency offset may be implemented using, or performed by, the components of the hybrid network 100 detailed herein with respect to FIG. 1, such as a satellite and/or an endpoint. Additional, fewer, or different operations may be performed in the method 600 depending on the embodiment. Without loss of generality, the embodiment herein will be described with respect to the endpoint 101 and the satellite 102. The maximum spreading factor of the downlink may be lower than the maximum spreading factor of the uplink. At the maximum spreading factor of the downlink, the rate of Doppler frequency change may not be a significant problem for downlink performance.

At operation 601, the endpoint 101 can make a first frequency measurement, f1, during a first downlink timeslot. At operation 602, the endpoint 101 can make a second frequency measurement, f2, during a second downlink timeslot. The time between the two frequency measurements may be referred to as time t1. In some embodiments, the first frequency measurement and the second frequency measurement are performed during a same downlink timeslot. At operation 603, the endpoint 101 can determine the rate of Doppler frequency change. At operation 604 based on the two frequency measurements, the endpoint 101 may apply a rate of frequency offset that cancels out the rate of Doppler frequency change by applying the frequency ramp of $f(t)=(f2-f1)/t1 \times (t+t2)$ during the uplink timeslot interval. The value t2 is the time between the second frequency estimate and the beginning of the uplink timeslot interval. In some embodiments, the applied rate of frequency offset is timevarying. In some embodiments, the applied rate of frequency offset is linear. In some embodiments, the applied rate of frequency offset is quadratic.

Figure 7:
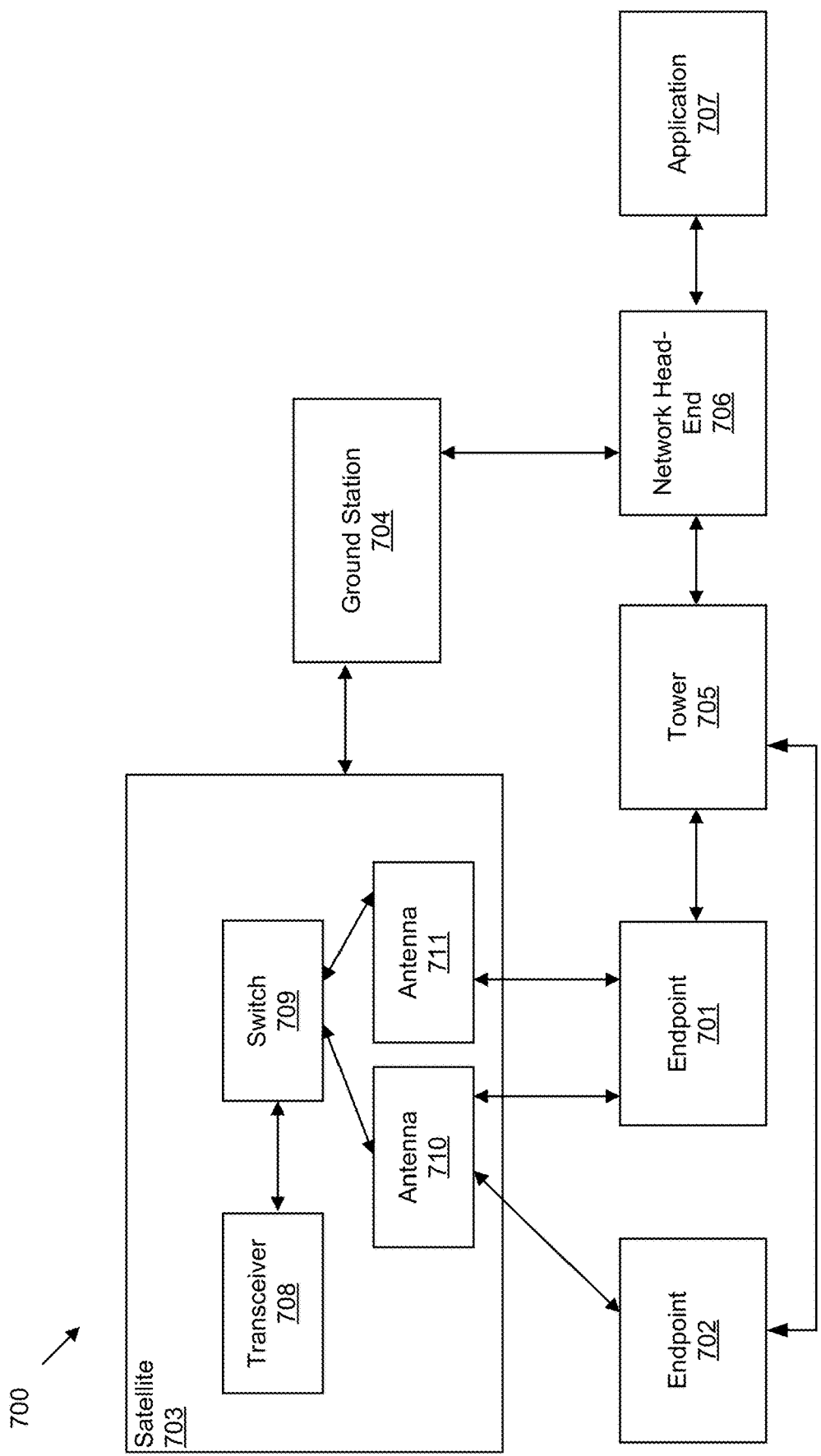
FIG. 7 is an example block diagram of a satellite network for selecting a satellite antenna, in accordance with some embodiments of the present disclosure.

Referring now to FIG. 7, a satellite network 700 for selecting a satellite antenna is shown. The satellite network 700 may include an endpoint 701, an endpoint 702, a satellite 703, a ground station 704, a tower 705, a network head-end 706, and an application 707. The satellite 703 may include a transceiver 708, a switch 709, an antenna 710, and an antenna 711. One port of the switch 709 may be coupled to the transceiver 708. A second port of the switch 709 may be coupled to the antenna 710. A third port of the switch 709 may be coupled to the antenna 711. The components of the satellite network 700 may be instances of the components of the hybrid network 100 described with respect to FIG. 1. For example, the endpoints 701 and 702 may be instances of the endpoint 101 described with respect to FIG. 1. In some embodiments, the satellite network 700 may include greater than or less components. For example, the satellite network 700 may include greater than or less than two endpoints.

The satellite 703 may optimize the performance of the satellite network 700 over time. A low gain antenna, such as the antenna 710, and a high gain antenna, such as the antenna 711, may be selectable by the switch 709 for electrical coupling to the transceiver 708. Without loss of generality, the embodiment herein will be described with respect to the antenna 710 and the antenna 711. The switch 709 setting may be set such that the low gain antenna, antenna 710, is electrically coupled, via the switch 709, to the transceiver 708. In some such embodiments, the satellite 703 covers the endpoints 701 and 702. The footprint of the satellite 703 may be maximized in this setting. The switch 709 setting may be changed such that the antenna 711 is electrically coupled, via the switch 709, to the transceiver 708. In some embodiments, the satellite 703 is configured to use the higher gain antenna when a sufficient number of satellites are part of the constellation. The footprint of the antenna 711 may be smaller, such that the satellite 703 does not cover the endpoint 702. However, a neighboring satellite may be covering the endpoint 702, as the density of the constellation may have increased. Thus, the endpoint 701 may have deeper coverage due to the higher antenna gain of the antenna 711.

Each of the elements or entities corresponding to the FIGS. 1-7 may be implemented using hardware or a combination of hardware or software, in one or more embodiments. For instance, each of these elements or entities can include any application, program, library, script, task, service, process or any type and form of executable instructions executing on hardware of one or more of the components of the hybrid network 100, the satellite network 500, and/or the satellite network 700. The hardware includes circuitry such as one or more processors and/or modems in one or more embodiments. Each of the one or more processors and/or modems is hardware or a combination of hardware or software.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A satellite comprising:
a transceiver;
a first antenna;
a second antenna; and
a switch to:
  enable only the first antenna by electrically coupling the first antenna to the transceiver responsive to a satellite constellation having less than a threshold number of satellites; and
  enable only the second antenna by electrically coupling the second antenna to the transceiver responsive to the satellite constellation having greater than the threshold number of satellites,
  wherein the satellite receives the satellite constellation from a location server.

2. The satellite of claim 1, wherein the first antenna has a lower gain than the second antenna.

3. The satellite of claim 1, wherein the first antenna has a larger footprint than the second antenna.

4. The satellite of claim 1, wherein the satellite can communicate with a first endpoint and a second endpoint responsive to the switch only enabling the first antenna, and wherein the satellite can only communicate with the first endpoint responsive to the switch only enabling the second antenna.

5. A method comprising:
responsive to a number of satellites in a satellite constellation becoming greater than a threshold number:
  disabling, by a switch, a first antenna by disconnecting the first antenna from a transceiver; and
  enabling, by the switch, a second antenna by connecting the second antenna to the transceiver,
  wherein the satellite receives the satellite constellation from a location server.

6. The method of claim 5, wherein the first antenna has a lower gain than the second antenna.

7. The method of claim 5, wherein the first antenna has a larger footprint than the second antenna.

8. The method of claim 5, wherein the satellite can communicate with a first endpoint and a second endpoint responsive to the switch only enabling the first antenna, and wherein the satellite can only communicate with the first endpoint responsive to the switch only enabling the second antenna.

9. A non-transitory computer readable storage medium to store a computer program configured to execute operations comprising:
responsive to a number of satellites in a satellite constellation becoming greater than a threshold number:
  disabling a first antenna by disconnecting the first antenna from a transceiver; and
  enabling a second antenna by connecting the second antenna to the transceiver,
  wherein the satellite receives the satellite constellation from a location server.

10. The non-transitory computer readable storage medium of claim 9, wherein the first antenna has a lower gain than the second antenna.

11. The non-transitory computer readable storage medium of claim 9, wherein the first antenna has a larger footprint than the second antenna.

12. The non-transitory computer readable storage medium of claim 9, wherein the satellite can communicate with a first endpoint and a second endpoint responsive to the computer program only enabling the first antenna, and wherein the satellite can only communicate with the first endpoint responsive to the computer program only enabling the second antenna.

13. A satellite comprising:
a transceiver;
a first antenna;
a second antenna; and
a switch to:
  enable only the first antenna by electrically coupling the first antenna to the transceiver responsive to a satellite constellation having less than a threshold number of satellites; and
  enable only the second antenna by electrically coupling the second antenna to the transceiver responsive to the satellite constellation having greater than the threshold number of satellites, wherein the first antenna has a lower gain than the second antenna.

14. A method comprising:
responsive to a number of satellites in a satellite constellation becoming greater than a threshold number:
  disabling, by a switch, a first antenna by disconnecting the first antenna from a transceiver; and
  enabling, by the switch, a second antenna by connecting the second antenna to the transceiver, wherein the first antenna has a lower gain than the second antenna.

15. A non-transitory computer readable storage medium to store a computer program configured to execute operations comprising:
responsive to a number of satellites in a satellite constellation becoming greater than a threshold number:
  disabling a first antenna by disconnecting the first antenna from a transceiver; and enabling a second antenna by connecting the second antenna to the transceiver, wherein the first antenna has a lower gain than the second antenna, wherein the first antenna has a lower gain than the second antenna.

* * * * *